(12) United States Patent
Nishidate

(10) Patent No.: US 10,312,767 B2
(45) Date of Patent: Jun. 4, 2019

(54) BEARING DEVICE AND BRUSHLESS MOTOR

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 0 days.

(21) Appl. No.: 15/804,198

(22) Filed: Nov. 6, 2017

(65) Prior Publication Data

US 2018/0166943 A1 Jun. 14, 2018

(30) Foreign Application Priority Data

Dec. 14, 2016 (JP) .................. 2016 242029

(51) Int. Cl.
| F16C 17/04 | (2006.01) |
| F16C 33/74 | (2006.01) |
| F16C 27/08 | (2006.01) |
| H02K 1/14 | (2006.01) |
| H02K 1/18 | (2006.01) |
| H02K 5/16 | (2006.01) |

(Continued)

(52) U.S. Cl.
CPC .............. *H02K 5/163* (2013.01); *F16C 17/04* (2013.01); *F16C 27/08* (2013.01); *F16C 33/104* (2013.01); *F16C 33/74* (2013.01); *F16C 41/004* (2013.01); *H02K 1/14* (2013.01); *H02K 1/18* (2013.01); *H02K 1/187* (2013.01); *H02K 1/27* (2013.01); *H02K 1/2786* (2013.01); *H02K 5/16* (2013.01); *H02K 5/167* (2013.01); *H02K 11/215* (2016.01); *H02K 21/22* (2013.01); *F16C 2380/26* (2013.01)

(58) Field of Classification Search
CPC ........ F16C 17/02; F16C 17/026; F16C 33/10; F16C 33/104; F16C 33/107; F16C 33/74; F16C 27/08; F16C 2380/26; F16C 17/04; F16C 41/004; H02K 1/14; H02K 1/18; H02K 1/187; H02K 1/27; H02K 1/2786; H02K 5/16; H02K 5/163; H02K 5/167; H02K 21/22; H02K 11/215
See application file for complete search history.

(56) References Cited

U.S. PATENT DOCUMENTS 5,810,481 A  *  9/1998  Nii .................. F16C 17/10
                                                        384/107
6,316,856 B1  *  11/2001  Kusaki .............. F16C 17/026
                                                        310/67 R (Continued)

FOREIGN PATENT DOCUMENTS

| JP | 2016164436 A | 9/2016 |
| JP | 2007252193 A | 9/2017 |

*Primary Examiner* — Alan B Waits
(74) *Attorney, Agent, or Firm* — Jordan and Koda, PLLC

(57) ABSTRACT

A washer member 22a and a seal member 41a are disposed in a mutually non-contacting state in the axial direction. A rotary shaft 11 has an annular groove 11a in the outer circumferential face. A minimum diameter part 11a3 of the annular groove 11a is disposed between the uppermost surface of the washer member 22a and the lowermost surface of the seal member 41a. The upper end of the annular groove 11a is disposed axially below the uppermost surface of the seal member 41a. The outer surface of the seal member 41a and the outer circumferential face of the rotary shaft 11 that faces the seal member 41a in the radial direction are subjected to oil-repellent treatment.

12 Claims, 6 Drawing Sheets

(51) Int. Cl.
*H02K 1/27* (2006.01)
*H02K 11/215* (2016.01)
*H02K 21/22* (2006.01)
*H02K 5/167* (2006.01)
*F16C 41/00* (2006.01)
*F16C 33/10* (2006.01)

(56) References Cited

U.S. PATENT DOCUMENTS

| | | | | |
|---|---|---|---|---|
| 6,513,979 | B2* | 2/2003 | Mori | F16C 17/107 |
| | | | | 384/100 |
| 2003/0091249 | A1* | 5/2003 | Kurimura | F16C 17/026 |
| | | | | 384/100 |
| 2007/0230843 | A1* | 10/2007 | Kurimura | F16C 17/107 |
| | | | | 384/130 |
| 2007/0274617 | A1* | 11/2007 | Shibahara | F16C 17/107 |
| | | | | 384/107 |
| 2010/0034494 | A1* | 2/2010 | Hori | F16C 17/107 |
| | | | | 384/114 |
| 2015/0147010 | A1* | 5/2015 | Komatsubara | F16C 33/74 |
| | | | | 384/107 |
| 2016/0258485 | A1* | 9/2016 | Takeuchi | F04D 25/062 |
| 2017/0167537 | A1* | 6/2017 | Tuchiya | F16C 33/104 |

* cited by examiner

BEARING DEVICE AND BRUSHLESS MOTOR

BACKGROUND

1. Technical Field

The present invention relates to a bearing device having an oil-impregnated bearing made from a porous sintered metal material and a brushless motor provided with this bearing device.

2. Related Art

For example, Japanese Patent Laid-Open Publication No. 2007-252193 describes a bearing structure comprising: an oil-impregnated bearing; a rotary shaft that is supported by an oil-impregnated bearing and has a recess (annular groove) in the outer circumference; and a seal member covering the top face and the outer circumferential face of the oil-impregnated bearing. With this bearing structure, it is said that oil leakage can be prevented by the seal member, whereby the useful life of the oil-impregnated bearing can be extended.

Furthermore, Japanese Patent Laid-Open Publication No. 2016-164436 describes a bearing structure comprising: a rotary shaft that has an annular groove on the outer circumferential face; an oil-impregnated bearing that supports the rotary shaft; a bearing holder that holds the outer circumferential face of the oil-impregnated bearing; and a seal member that is fixed at the upper end of the bearing holder. This seal member is made of a porous sintered metal material having a density lower than the density of the sintered metal material for the oil-impregnated bearing, and has a large-diameter inner circumferential face, which faces the annular groove of the rotary shaft, and a small-diameter inner circumferential face, which forms a seal gap with respect to the outer circumferential face of the rotary shaft, the seal member being disposed in contact with the top face of the oil-impregnated bearing. In this bearing structure, when the rotary shaft rotates, the oil exuded from the oil-impregnated bearing is transmitted upward on the rotary shaft, and when it reaches the annular groove, it is sprayed outward in the radial direction by the centrifugal force of the rotary shaft. Furthermore, the sprayed oil is received on the large-diameter inner circumferential face of the seal member and is absorbed by the seal member. Thereupon, due to a capillary phenomenon caused by the difference in density between the seal member and the oil-impregnated bearing, the oil that has been absorbed into the seal member moves to the oil-impregnated bearing, whereby it is said that the oil in the oil-impregnated bearing can be recirculated.

However, with the bearing structure of Japanese Patent Laid-Open Publication No. 2007-252193, the recess in the rotary shaft is disposed outside the seal member, and therefore, when the motor is used in the horizontal state (a state in which the rotary shaft is horizontal), the oil from the oil-impregnated bearing which has been transmitted to the recess in the rotary shaft will disadvantageously leak to the outside of the bearing structure, which is a problem in so much as the useful life of the oil-impregnated bearing is reduced.

On the other hand, with the bearing structure in Japanese Patent Laid-Open Publication No. 2016-164436, the annular groove in the rotary shaft is disposed inside the seal member, and therefore oil from the oil-impregnated bearing does not disadvantageously leak directly from the annular groove to the outside of the bearing structure.

However, with the bearing structure in Japanese Patent Laid-Open Publication No. 2016-164436, oil that has sprayed radially outward from the annular groove in the rotary shaft strikes the large-diameter inner circumferential face of the seal member, and some of the oil that rebounds from the large-diameter inner circumferential face will readily be redeposited on the portion above the annular groove in the rotary shaft. Therefore, when the motor is used in the horizontal state, the oil from the oil-impregnated bearing that has been redeposited on the portion above the annular groove is likely to leak to the outside of the bearing structure, which is a problem in so much as the useful life of the oil-impregnated bearing is reduced.

Furthermore, with the bearing structure in Japanese Patent Laid-Open Publication No. 2016-164436, the seal member is press-fitted on the bearing holder so as to contact the oil-impregnated bearing, and therefore, if the press-fitting force is too strong, the pores of the seal member tend to be crushed, such that the capillary phenomenon at the contact faces between the seal member and the oil-impregnated bearing cannot readily be utilized. Furthermore, if this press-fitting force is too small, the seal member and the oil-impregnated bearing will not come into sufficient contact, such that the capillary phenomenon cannot be obtained. For this reason, it is difficult to manage the press-fitting and there is a problem in that the quality tends to be unstable.

SUMMARY

In one or more embodiments of the present invention, a bearing device and a brushless motor comprising this bearing device are provided, in which press-fitting of the seal member can be managed easily and leakage of oil from the oil-impregnated bearing to the outside of the bearing structure can be effectively prevented in both the upright state and the horizontal state, allowing the life of the bearing device to be extended.

Note that, in the aspects described below, the constituent elements employed can be used in the most freely chosen combinations possible. Furthermore, the aspects and technical features of the present invention are not limited to those described hereafter, and are to be understood based on the description in the entire specification and the drawings or the inventive ideas that can be grasped by the skilled artisan on the basis of these descriptions.

A first aspect of the present invention relating to a bearing device comprises:

a vertically elongated rotary shaft;

an annular oil-impregnated bearing that rotatably supports the rotary shaft;

a bearing holder having an opening at the upper end that holds the oil-impregnated bearing at the inside; and a washer member disposed on the top face of the oil-impregnated bearing;

an annular seal member through which the rotary shaft is inserted, which is fixed at the upper end of the bearing holder so as to close the opening, wherein the outer surface of the seal member and the outer circumferential face of the rotary shaft that faces to the seal member in the radial direction are subjected to oil-repellent treatment;

the washer member and the seal member are disposed in a mutually non-contacting state in the axial direction;

the rotary shaft has an annular groove in the outer circumferential face, and an upper portion of the rotary shaft protrudes upward beyond the seal member;

a minimum diameter part of the annular groove is disposed between the uppermost surface of the washer member and the lowermost surface of the seal member; and the upper end of the annular groove is disposed below the uppermost surface of the seal member in the axial direction.

A second aspect of the present invention relating to a brushless motor is such that in a brushless motor having a bearing device in which a vertically elongated rotary shaft is rotatably supported by an annular oil-impregnated bearing, the bearing device comprises:
a bearing holder having an opening at the upper end that holds the oil-impregnated bearing at the inside;
a washer member disposed on the top face of the oil-impregnated bearing; and
an annular seal member through which the rotary shaft is inserted, which is fixed at the upper end of the bearing holder so as to close the opening, wherein the outer surface of the seal member and the outer circumferential face of the rotary shaft that faces to the seal member in the radial direction are subjected to oil-repellent treatment;

the washer member and the seal member are disposed in a mutually non-contacting state in the axial direction;

the rotary shaft has an annular groove in the outer circumferential face, and an upper portion of the rotary shaft protrudes upward beyond the seal member;

a minimum diameter part of the annular groove is disposed between the uppermost surface of the washer member and the lowermost surface of the seal member; and the upper end of the annular groove is disposed below the uppermost surface of the seal member in the axial direction

DETAILED DESCRIPTION OF THE PREFERRED EMBODIMENTS

Figure 1:
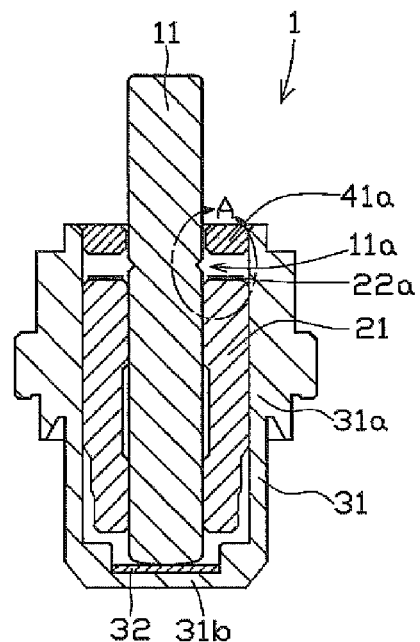
FIG. 1 is a sectional view of a bearing device according to a first exemplary mode of embodiment of the present invention.
Figure 2:
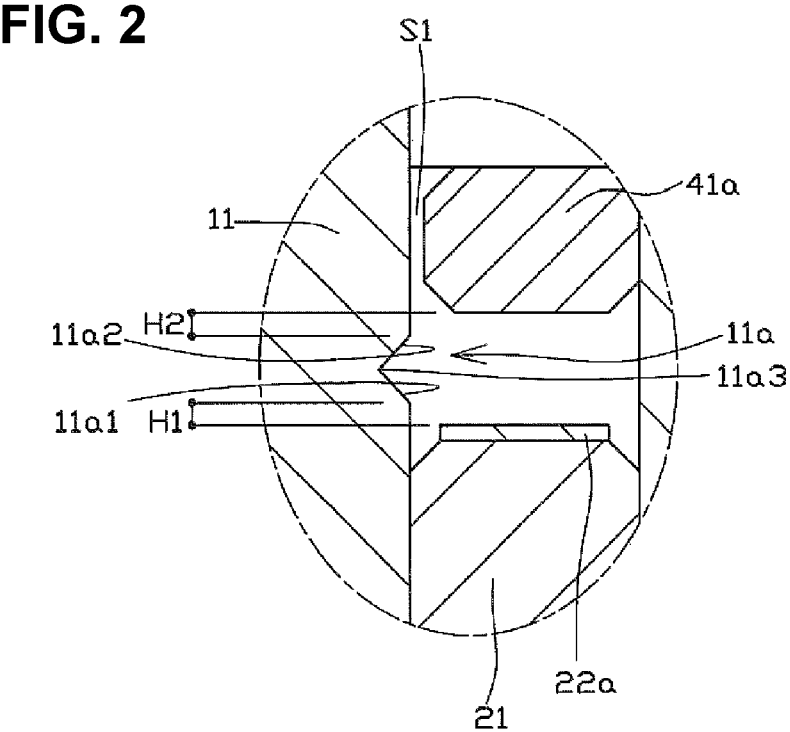
FIG. 2 is an enlarged partial sectional view of a portion A in FIG. 1.

In the present specification, in relation to the rotary shaft 11 in FIG. 1 and FIG. 2, the upward direction is referred to simply as "upward", and the downward direction is referred to simply as "downward." Furthermore, the direction parallel to the rotary shaft 11 is referred to as the "axial direction," the radial direction centered on the rotary shaft 11 is referred to simply as the "radial direction," and the circumferential direction centered on the rotary shaft 11 is referred to simply as the "circumferential direction."

Furthermore, the state in FIG. 1 and FIG. 2 is referred to as the upright state (a state in which the rotary shaft is upright), and the state in which the rotary shaft 11 is disposed at right angles to the upright state is referred to as the horizontal state (a state in which the rotary shaft is horizontal).

Note that, the upward and downward directions do not indicate positional relationships or directions when the actual device is assembled.

Hereinafter exemplary modes of embodiment of the present invention are illustratively described based on the drawings.

First Exemplary Mode of Embodiment

First, a bearing device 1 according to a first exemplary mode of embodiment of the present invention will be described with reference to FIG. 1 and FIG. 2.

The bearing device 1 has a rotary shaft 11, an oil-impregnated bearing 21, a bearing holder 31, a washer member 22a, and a seal member 41a.

The rotary shaft 11, which is made of metal and is formed in a vertically elongated columnar shape having a constant diameter, serves to transmit rotational force to the outside. An annular groove 11a is formed in the outer circumferential face of the rotary shaft 11 in an axially intermediate portion. The sectional shape of the annular groove 11a constitutes a V groove which opens radially outward and has a first inclined straight part 11a1 in which the outer diameter of the rotary shaft 11 decreases advancing from the lower end to the upper end, and a second inclined straight part 11a2, continuing upward from the first inclined straight part 11a1, in which the outer diameter of the rotary shaft 11 increases advancing from the lower end to the upper end. A minimum diameter part 11a3, at which the outer diameter of the rotary shaft 11 is at a minimum, is formed between the first inclined straight part 11a1 and the second inclined straight part 11a2. The first inclined straight part 11a1 and the second inclined straight part 11a2 are formed at angles of inclination of 45 degrees, with respect to the axial direction.

The oil-impregnated bearing 21 is an annular radial bearing that rotatably supports the rotary shaft 11 in the radial direction, with lubricating oil as a medium. The oil-impregnated bearing 21 is a cylindrical body formed from a porous sintered metal material, which is impregnated with lubricating oil. The inner diameter of the oil-impregnated bearing 21 is formed slightly larger than the outer diameter of the rotary shaft 11.

The bearing holder 31 holds the rotary shaft 11 and the oil-impregnated bearing 21. The bearing holder 31 is made of metal and has a cylindrical part 31a and a bottom part 31b that closes the bottom end of the cylindrical part 31a. The cylindrical part 31a has an opening at the upper end.

The inner diameter of the bearing holder 31 is substantially the same as the outer diameter of the oil-impregnated bearing 21.

A thrust receiving member 32, which supports the bottom end of the rotary shaft 11 is disposed on the top face of the bottom part 31b. The oil-impregnated bearing 21 is held on the inner circumferential face of the cylindrical part 31a and contained in the bearing holder 31.

The washer member 22a is serves to prevent the oil on the top face of the oil-impregnated bearing 21 from easily flowing to the surroundings in the horizontal state, and is disposed inside the bearing holder 31, in contact with the top face of the oil-impregnated bearing 21.

The washer member 22a is made of a resinous hard material or a soft material, having flat surfaces with high flatness at the top and bottom faces thereof, and has an insertion hole, through which the rotary shaft 11 can be inserted, in the center.

The inner diameter of the washer member 22a is formed slightly larger than the inner diameter of the oil-impregnated bearing 21. Furthermore, the outer diameter of the washer member 22a is formed slightly smaller than the inner diameter of the bearing holder 31.

Note that the washer member 22a may also be made of a metal material.

The seal member 41a is formed in an annular shape, and is fixed at the upper portion of the cylindrical part 31a so as to close the opening in the bearing holder 31. This seal member 41a serves to prevent the oil from the oil-impregnated bearing 21 from leaking to the outside of the bearing holder 31.

This seal member 41a is a cylindrical body made of a hard metal material and has a through-hole, through which the rotary shaft 11 can be inserted.

The seal member 41a is fixed to the inner circumferential face of the cylindrical part 31a by press-fitting so that the uppermost surface of the seal member 41a and the upper end of the cylindrical part 31a are flush with each other in the axial direction.

Note that a gap is provided between the uppermost surface of the washer member 22a and the lowermost surface of the seal member 41a, such that the washer member 22a and the seal member 41a are disposed in a mutually non-contacting state in the axial direction.

Furthermore, the inner diameter of the seal member 41a (through-hole diameter) is formed slightly larger than the outer diameter of the rotary shaft 11. In other words, the rotary shaft 11 and the seal member 41a are disposed in non-contact proximity. The entire surface of the seal member 41a is subjected to oil-repellent treatment.

Furthermore, the outer circumferential face of the rotary shaft 11 that faces the seal member 41a in the radial direction is subjected to oil-repellent treatment. Thus, although there is a first gap S1 between inner circumferential face of the seal member 41a and the outer circumferential face of the rotary shaft 11, which is the radial closing gap, oil from the oil-impregnated bearing 21 does not enter this first gap S1.

The seal member 41a is formed of, for example, a sintered metal material to which an oil repellent has been added, or a resin coated with an oil repellent.

The annular groove 11a in the rotary shaft 11 is disposed between the washer member 22a and the seal member 41a in the axial direction.

More specifically, the entirety of the annular groove 11a in the rotary shaft 11 is disposed between the uppermost surface of the washer member 22a and the lowermost surface of the seal member 41a in the axial direction. Accordingly, the entirety of the annular groove 11a in the rotary shaft 11 faces the inner circumferential face of the bearing holder 31 in the radial direction. Furthermore, the minimum diameter part 11a3 is disposed between the uppermost surface of the washer member 22a and the lowermost surface of the seal member 41a in the axial direction. The length from the lower end to the upper end of the annular groove 11a in the axial direction is approximately half of the length from the uppermost surface of the washer member 22a to the lowermost surface of the seal member 41a in the axial direction.

More specifically, the lower end of the annular groove 11a is disposed axially above the uppermost surface of the washer member 22a. That is to say, the lower end of the annular groove 11a is disposed above the uppermost surface of the washer member 22a by a distance H1 in the axial direction. A lower circumferential face is formed on the outer circumferential face in the circumferential direction on the rotary shaft 11 between the uppermost surface of the washer member 22a and the lower end of the annular groove 11a. The lower circumferential face faces the inner circumferential face of the bearing holder 31 in the radial direction.

The upper end of the annular groove 11a is disposed axially below the lowermost surface of the seal member 41a. That is to say, the upper end of the annular groove 11a is disposed below the lowermost surface of the seal member 41a by a distance H2 in the axial direction. An upper circumferential face is formed on the rotary shaft 11 between the upper end of the annular groove 11a and the lowermost surface of the seal member 41a. The upper circumferential face faces the inner circumferential face of the bearing holder 31 in the radial direction.

Thus, the bearing device 1 has a vertically elongated rotary shaft 11, an annular oil-impregnated bearing 21 that rotatably supports the rotary shaft 11, and a bearing holder 31 having an opening at the upper end that holds the oil-impregnated bearing 21 at the inside. The bearing device 1 further has a washer member 22a disposed on the top face of the oil-impregnated bearing 21, and an annular seal member 41a, into which the rotary shaft is inserted, which is fixed at the upper end of the bearing holder 31 so as to close the opening in the bearing holder 31.

Furthermore, the outer surface of the seal member 41a and the outer circumferential face of the rotary shaft 11 that faces the seal member 41a in the radial direction are subjected to oil-repellent treatment.

Furthermore, the washer member 22a and the seal member 41a are disposed in a mutually non-contacting state in the axial direction.

Furthermore, the rotary shaft 11 has an annular groove 11a in the outer circumferential face, and the upper portion of the rotary shaft 11 protrudes upward beyond the seal member 41a.

Furthermore, the minimum diameter part 11a3 of the annular groove 11a is disposed between the uppermost surface of the washer member 22a and the lowermost surface of the seal member 41a.

Furthermore, the upper end of the annular groove 11a is disposed axially below the uppermost surface of the seal member 41a.

Next, the actions and effects of the bearing device 1 will be described.

First, the situation in which the rotary shaft 11 is rotating in the upright state will be described.

When the rotary shaft 11 rotates, the oil exuded from the oil-impregnated bearing 21 is transmitted upward on the rotary shaft 11 and, upon reaching the second inclined straight part 11a2 of the annular groove 11a, from the first inclined straight part 11a1, the oil from the oil-impregnated bearing 21 accumulates in the minimum diameter part 11a3. When the oil from the oil-impregnated bearing 21 accumulates in the minimum diameter part 11a3 in excess of a predetermined amount, the oil from the oil-impregnated bearing 21 is sprayed outward in the radial direction by the centrifugal force of the rotary shaft 11. The oil that is sprayed outward in the radial direction from the rotary shaft 11 strikes the inner circumferential face of the bearing holder 31 and flows downward via the inner circumferential face of the bearing holder 31. The oil flowing downward on the inner circumferential face of the bearing holder 31 is absorbed at the top face of the oil-impregnated bearing 21, and thus returned to the oil-impregnated bearing 21, by way of a gap between the inner circumferential face of the bearing holder 31 and the outer circumferential face of the washer member 22a.

In the bearing device 1 of this example, most of the oil exuded upward from the oil-impregnated bearing 21 on the rotary shaft 11 is sprayed radially outward from the minimum diameter part 11a3 by the centrifugal force of the rotary shaft 11, substantially without reaching the upper circumferential face of the rotary shaft 11.

Even supposing that the oil from the oil-impregnated bearing 21 were to go beyond the second inclined straight part 11a2 and be deposited on the upper circumferential face, or that oil that had rebounded from the inner circumferential face of the bearing holder 31 were to be sprayed obliquely upward and be redeposited on the upper circumferential face, because the outer circumferential face of the rotary shaft 11 that faces the seal member 41a in the radial direction has been subjected to oil-repellent treatment, the oil from the oil-impregnated bearing 21 will not enter the first gap S1, and thus will not leak to the outside of the bearing device 1.

When the rotary shaft 11 is stopped in the upright state, the oil from the oil-impregnated bearing 21 flows downward, and thus does not leak to the outside of the bearing device 1.

Next, the situation in which the rotary shaft 11 is rotating in the horizontal state will be described.

When the rotary shaft 11 rotates, the oil exuded from the oil-impregnated bearing 21 is transmitted upward on the rotary shaft 11 and, upon reaching the second inclined straight part 11a2 of the annular groove 11a, from the first inclined straight part 11a1, the oil from the oil-impregnated bearing 21 accumulates in the minimum diameter part 11a3. When the oil from the oil-impregnated bearing 21 accumulates in the minimum diameter part 11a3 in excess of a predetermined amount, the oil from the oil-impregnated bearing 21 is sprayed outward in the radial direction by the centrifugal force of the rotary shaft 11. The oil sprayed outward in the radial direction from the rotary shaft 11 strikes the inner circumferential face of the bearing holder 31 and does not leak to the outside of the bearing device 1.

Even supposing that the oil from the oil-impregnated bearing 21 were to go beyond the second inclined straight part 11a2 and be deposited on the upper circumferential face, or that oil that had rebounded from the inner circumferential face of the bearing holder 31 were to be sprayed obliquely upward and be redeposited on the upper circumferential face, because the outer surface of the seal member 41a and the outer circumferential face of the rotary shaft 11 that faces the seal member 41a in the radial direction have been subjected to oil-repellent treatment, the oil from the oil-impregnated bearing 21 will not enter the first gap S1, and thus will not leak to the outside of the bearing device 1.

Next, the situation in which the rotary shaft 11 is stopped in the horizontal state will be described.

The oil exuded from the oil-impregnated bearing 21 is transmitted upward on the rotary shaft 11 but is retained in the annular groove 11a that is disposed inward of the seal member 41a and therefore does not move above the annular groove 11a and thus does not leak to the outside of the bearing device 1.

Even supposing that the oil from the oil-impregnated bearing 21 were to be deposited on the upper circumferential face, because the outer surface of the seal member 41a and the outer circumferential face of the rotary shaft 11 that faces the seal member 41a in the radial direction have been subjected to oil-repellent treatment, the oil from the oil-impregnated bearing 21 will not enter the first gap S1, and thus will not leak to the outside of the bearing device 1.

Thus, in all of the situations, in which the rotary shaft 11 is rotating in the upright state, in which the rotary shaft 11 is rotating in the horizontal state, in which the rotary shaft 11 is stopped in the upright state, and in which the rotary shaft 11 is stopped in the horizontal state, the oil from the oil-impregnated bearing 21 will not leak to the outside of the bearing device 1.

With the bearing device 1 of this example, because the minimum diameter part 11a3 of the rotary shaft 11 is disposed between the uppermost surface of the washer member 22a and the lowermost surface of the seal member 41a, the minimum diameter part 11a3 faces the inner circumferential face of the bearing holder 31 in the radial direction. Accordingly, the distance until oil that has been sprayed from the minimum diameter part 11a3 strikes is increased, such that this oil will not readily be redeposited on the rotary shaft 11, which facilitates recirculation of the oil.

Furthermore, with the bearing device 1 of this example, the washer member 22a and the seal member 41a are disposed in a mutually non-contacting state, such that the seal member 41a can be press-fitted into the bearing holder 31 without bringing it into contact with the oil-impregnated bearing 21, whereby the work characteristics in the press-fitting process are improved and the quality is improved.

Furthermore, because the upper end of the annular groove 11a is disposed axially below the lowermost surface of the seal member 41a, when the rotary shaft 11 rotates in the upright state, the majority of the oil that has accumulated in the annular groove 11a is sprayed onto the inner circumferential face of the bearing holder 31 without striking the inner circumferential face of the seal member 41a. Therefore, oil sprayed from the annular groove 11a will not readily be redeposited on the rotary shaft 11, and thus will efficiently return to the oil-impregnated bearing 21, improving the oil recirculation function.

Furthermore, because the lower end of the annular groove 11a is disposed axially above the uppermost surface of the washer member 22a, when the rotary shaft 11 rotates in the upright state, the majority of the oil that has accumulated in the annular groove 11a is sprayed onto the inner circumferential face of the bearing holder 31 without striking the inner circumferential face of the washer member 22a. Therefore, oil sprayed from the annular groove 11a will not readily be redeposited on the rotary shaft 11, improving the oil recirculation function.

Furthermore, there is a gap between the inner circumferential face of the bearing holder 31 and the outer circumferential face of the washer member 22a. Therefore, oil that is sprayed outward in the radial direction from the annular groove 11a and strikes the inner circumferential face of the bearing holder 31 flows first on the inner circumferential face of the bearing holder 31, then into the gap between the inner circumferential face of the bearing holder 31 and the outer circumferential face of the washer member 22a, and then onto the top face of the oil-impregnated bearing 21, so as to be efficiently returned to the oil-impregnated bearing 21, improving the oil recirculation function.

Furthermore, with the bearing device 1 of this example, an upper circumferential face is formed on the outer circumferential face of the rotary shaft 11, between the upper end of the annular groove 11a and the lowermost surface of the seal member 41a. In this case, in order to better prevent the oil from the oil-impregnated bearing from leaking to the outside of the bearing device 1, it is preferable that the upper circumferential face is subjected to oil-repellent treatment along the entire circumference. In this case, the upper end portion where the upper circumferential face has been subjected to the oil-repellent treatment is continuous with the lower end portion of the outer circumferential face of the rotary shaft 11 which faces the seal member 41a, which has been subjected to the oil-repellent treatment.

Note that it is acceptable for the lower end portion where the upper circumferential face has been subjected to the oil-repellent treatment not to reach the upper end of the annular groove 11a.

Second Exemplary Mode of Embodiment

Figure 3:
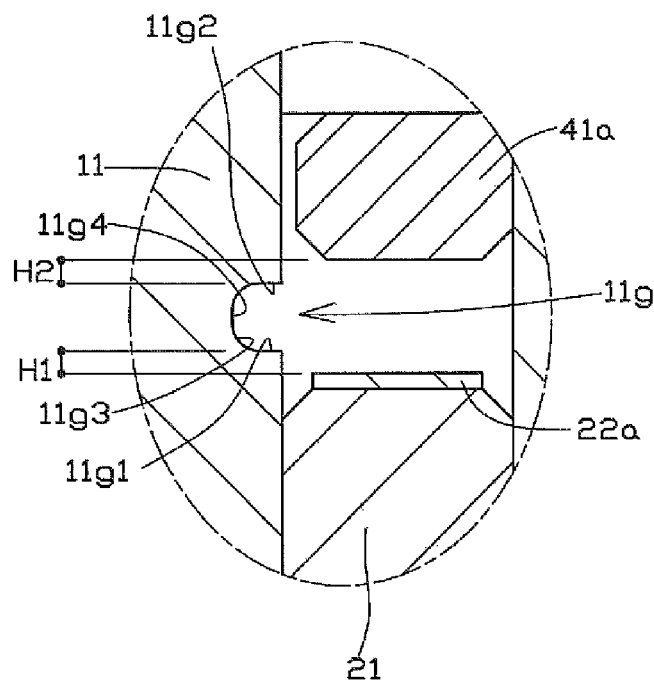
FIG. 3 is a partial sectional view of a bearing device according to a second exemplary mode of embodiment of the present invention.

A second exemplary mode of embodiment of the present invention will be described with reference to FIG. 3. In FIG. 3, parts that are the same as parts in FIG. 1 and FIG. 2 are given identical reference numerals, and description of redundant parts is omitted.

The sectional shape of the annular groove 11a in the first exemplary mode of embodiment is formed as a radially outwardly opening V groove, but the sectional shape of an annular groove 11g in this example is a radially outwardly opening U groove. The annular groove 11g has a first lower straight part 11g1, a first upper straight part 11g2, and a curved part 11g3 connecting the first lower straight part 11g1 and the first upper straight part 11g2. The minimum diameter part 11g4 of the annular groove 11g is the inner bottommost part of the curved part 11g3.

The lower end of the annular groove 11g is disposed above the uppermost surface of the washer member 22a by a distance H1 in the axial direction. The upper end of the annular groove 11g is disposed below the lowermost surface of the seal member 41a by a distance H2 in the axial direction.

The second exemplary mode of embodiment has the same actions and effects as those of the first exemplary mode of embodiment.

Third Exemplary Mode of Embodiment

Figure 4:
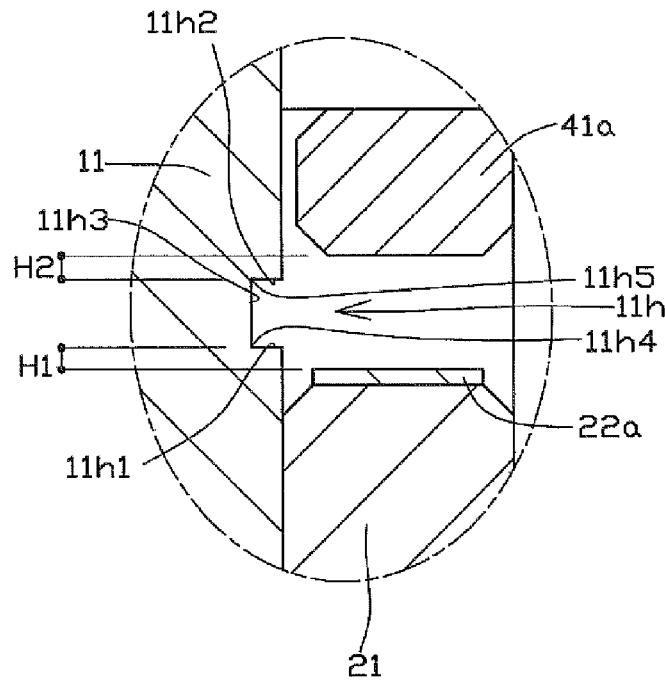
FIG. 4 is a partial sectional view of a bearing device according to a third exemplary mode of embodiment of the present invention.

A third exemplary mode of embodiment of the present invention will be described with reference to FIG. 4. In FIG. 4, parts that are the same as parts in FIG. 1 to FIG. 3 are given identical reference numerals, and description of redundant parts is omitted.

The sectional shape of the annular groove 11a in the first exemplary mode of embodiment is formed as a radially outwardly opening V groove, but the sectional shape of an annular groove 11h in this example is a radially outwardly opening rectangular groove. The annular groove 11h includes a second lower straight part 11h1, a second upper straight part 11h2, an axial straight part 11h3, a lower corner part 11h4 connecting the second lower straight part 11h1 and the axial straight part 11h3 and an upper corner part 11h5 connecting the second upper straight part 11h2 and the axial straight part 11h3. In the case of the annular groove 11h, the outer diameter of the rotary shaft 11 is at a minimum in two places, the upper corner part 11h5 and the lower corner part 11h4, but the oil from the oil-impregnated bearing 21 is sprayed radially outward from the minimum diameter part in the axially upper corner part 11h5.

The lower end of the annular groove 11h is disposed above the uppermost surface of the washer member 22a by a distance H1 in the axial direction. The upper end of the annular groove 11h is disposed below the lowermost surface of the seal member 41a by a distance H2 in the axial direction.

The third exemplary mode of embodiment has the same actions and effects as those of the first exemplary mode of embodiment.

Fourth Exemplary Mode of Embodiment

Figure 5:
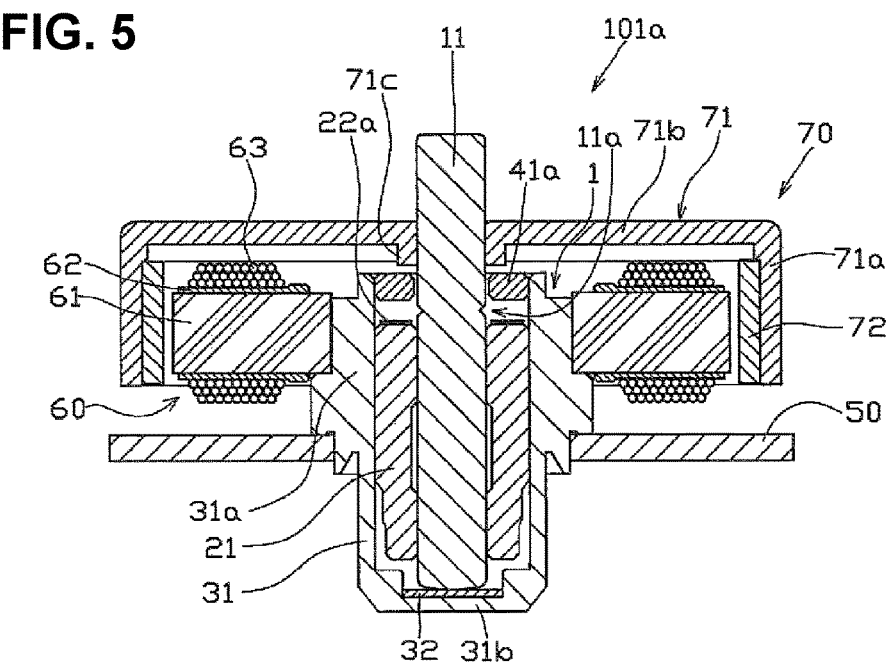
FIG. 5 is a sectional view of a brushless motor according to a fourth exemplary mode of embodiment of the present invention.

A fourth exemplary mode of embodiment of the present invention will be described with reference to FIG. 5. In FIG. 5, parts that are the same as parts in FIG. 1 to FIG. 4 are given identical reference numerals, and description of redundant parts is omitted.

FIG. 5 shows a brushless motor 101a which is a fourth exemplary mode of embodiment of the present invention. The brushless motor 101a primarily has a mounting plate 50, the bearing device 1 according to the first exemplary mode of embodiment, a stator 60, and a rotor 70.

The mounting plate 50 uses a so-called iron substrate, on the surface of which a printed circuit is formed, or a substrate in which a printed circuit board has been overlaid on an iron substrate. On the mounting plate 50, a Hall element (not shown) is disposed so as to face a drive magnet 72, which is described below, in the axial direction (vertical direction in FIG. 5) such that the rotation of the rotor 70 can be detected by way of this Hall element. The bearing device 1 is fixed to the mounting plate 50, and the stator 60 is fixed to the outer circumference of the bearing holder 31.

The stator 60 comprises a stator core 61, a core cover 62 and a coil 63. The stator core 61 is made from a stack of planar cores formed so as to have an opening at the center, with a plurality of salient poles, the surface of which is covered by a core cover 62, which is made from an insulating resin, and the coils 63 are wound onto the salient poles with this core cover 62 therebetween.

The rotor 70 comprises a rotor case 71 that rotates united with the rotary shaft 11 and a drive magnet 72 that is fixed to the inside the rotor case 71.

The rotor case 71 is made of a magnetic metal plate and has a cylindrical part 71a formed in a cylindrical shape, which is coaxial with the rotary shaft 11 and a planar top face part 71b that covers the top face of the cylindrical part 71a. A cylindrically shaped burring part 71c is formed oriented downward in the center of the top face part 71b, and the top part of the rotary shaft 11 is fastened by way of press-fitting into this burring part 71c.

A cylindrical drive magnet 72 is mounted on the inside of the cylindrical part 71a of the rotor case 71, so as to face the salient poles of the stator core 61 in the radial direction (left-right direction in FIG. 5). This drive magnet 72 is multiply and alternatingly magnetized, in the circumferential direction with N poles and S poles.

With the brushless motor 101a in this example, in all of the situations, in which the rotary shaft 11 is rotating in the upright state, in which the rotary shaft 11 is rotating in the horizontal state, in which the rotary shaft 11 is stopped in the upright state, and in which the rotary shaft 11 is stopped in the horizontal state, the oil from the oil-impregnated bearing 21 will not leak to the outside of the bearing device 1, and thus the quality of the brushless motor 101a can be improved.

Note that the present invention is not limited to the exemplary modes of embodiment described above and, for example, may be configured as follows.

In the first and second exemplary modes of embodiment, the lower end of the annular groove is disposed above the uppermost surface of the washer member 22a in the axial direction, and the upper end of the annular groove is disposed below the lowermost surface of the seal member 41a in the axial direction, but the invention is not limited to this. In the case in which the annular groove is a V groove and the case in which the annular groove is a U groove, as long as the minimum diameter part is disposed between the uppermost surface of the washer member 22a and the lowermost surface of the seal member 41a in the axial direction, the configuration may be as follows. Only the first exemplary mode of embodiment is illustrated in the drawings here, but the same applies to the second exemplary mode of embodiment.

Figure 6:
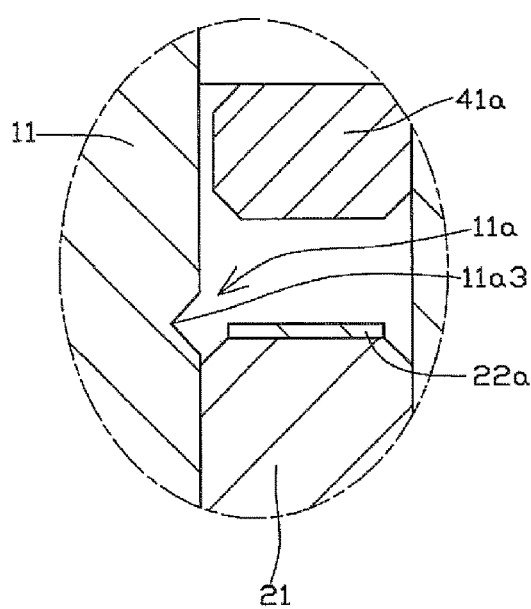
FIG. 6 is a variant of FIG. 2.

For example, as shown in FIG. 6, the minimum diameter part 11a3 may be disposed at the same height as the uppermost surface of the washer member 22a in the axial direction. In this case, the upper end of the annular groove 11a faces the inner circumferential face of the bearing holder 31 in the radial direction. Supposing that the minimum diameter part 11a3 were below the uppermost surface of the washer member 22a and disposed facing the inner circumferential face of the washer member 22a, oil that had been sprayed from the annular groove 11a in the radially outward direction and rebounded would readily be redeposited on the rotary shaft 11, such that the oil from the oil-impregnated bearing 21 would not readily be recirculated.

Here, as shown in FIG. 6, if the minimum diameter part 11a3 is disposed level with the uppermost surface of the washer member 22a in the axial direction, the oil from the oil-impregnated bearing 21 will be slightly less readily sprayed in the radially outward direction than in the first exemplary mode of embodiment but this will have similar actions and effects to those in the first exemplary mode of embodiment.

Figure 7:
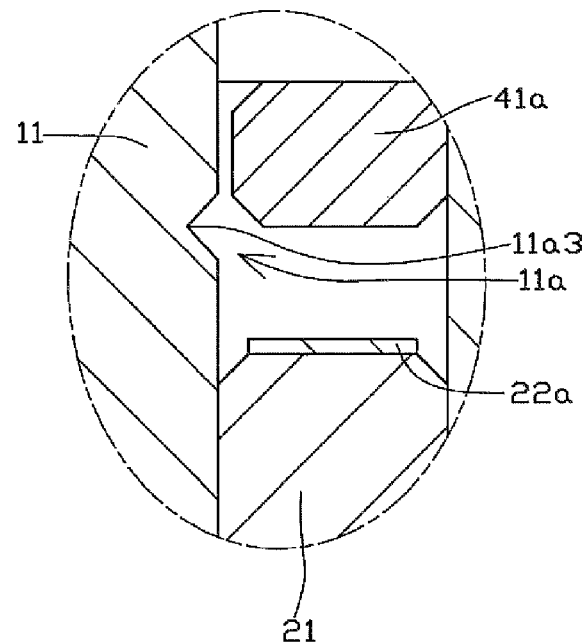
FIG. 7 is a variant of FIG. 2.

Furthermore, for example, as shown in FIG. 7, the minimum diameter part 11a3 may be disposed at the same height as the lowermost surface of the seal member 41a in the axial direction.

Supposing that the minimum diameter part 11a3 were above the lowermost surface of the seal member 41a and disposed facing the inner circumferential face of the seal member 41a in the radial direction, oil that had been sprayed from the annular groove 11a in the radially outward direction and rebounded would readily be redeposited on the rotary shaft 11, such that the oil from the oil-impregnated bearing 21 would not readily be recirculated.

Here, as shown in FIG. 7, if the minimum diameter part 11a3 is disposed at the same height as the lowermost surface of the seal member 41a in the axial direction, the oil from the oil-impregnated bearing 21 will be slightly less readily sprayed in the radially outward direction than in the first exemplary mode of embodiment but this will have similar actions and effects to those in the first exemplary mode of embodiment.

However, in FIG. 7, it is necessary that the upper end of the annular groove in the rotary shaft 11 to be disposed below the uppermost surface of the seal member 41a in the axial direction. Supposing that, in FIG. 7, the upper end of the annular groove 11a in the rotary shaft 11 were disposed above the uppermost surface of the seal member 41a in the axial direction, when the rotary shaft 11 was stopped in the horizontal state, the oil from the oil-impregnated bearing 21 that was retained in the annular groove 11a would leak to the outside of the bearing device.

In FIG. 7, because the upper end of the annular groove 11a in the rotary shaft 11 is disposed below the uppermost surface of the seal member 41a in the axial direction, even when the rotary shaft 11 is stopped in the horizontal state, the oil from the oil-impregnated bearing 21 that is retained in the annular groove 11a will not enter the first gap S1 and thus will not leak to the outside of the bearing device.

Next, in the third exemplary mode of embodiment, the lower end of the annular groove 11h in the rotary shaft 11 is disposed above the uppermost surface of the washer member 22a in the axial direction, and the upper end of the annular groove 11h is disposed below the lowermost surface of the seal member 41a in the axial direction, but the invention is not limited to this. In the case in which the annular groove is a rectangular groove, as long as the upper corner part 11h5 is disposed above the uppermost surface of the washer member 22a and between this and the lowermost surface of the seal member 41a in the axial direction, the configuration may be as follows.

Figure 8:
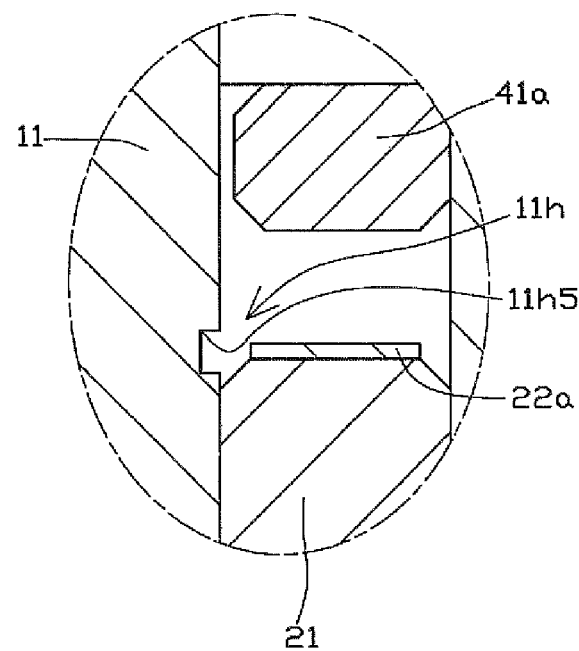
FIG. 8 is a variant of FIG. 4.

For example, as shown in FIG. 8, the upper corner part 11h5 may be disposed slightly above the uppermost surface of the washer member 22a in the axial direction.

Supposing that the upper corner part 11h5 were level with or below the uppermost surface of the washer member 22a and disposed facing the inner circumferential face of the washer member 22a or the oil-impregnated bearing 21 in the radial direction, oil that had been sprayed from the annular groove 11h in the radially outward direction and rebounded would readily be redeposited on the rotary shaft 11, such that the oil from the oil-impregnated bearing 21 would not readily be recirculated.

Here, as shown in FIG. 8, if the upper corner part 11h5 is disposed above the uppermost surface of the washer member 22a in the axial direction, the oil from the oil-impregnated bearing 21 will be slightly less readily sprayed in the radially outward direction than in the third exemplary mode of embodiment but this will have similar actions and effects to those in the third exemplary mode of embodiment.

Figure 9:
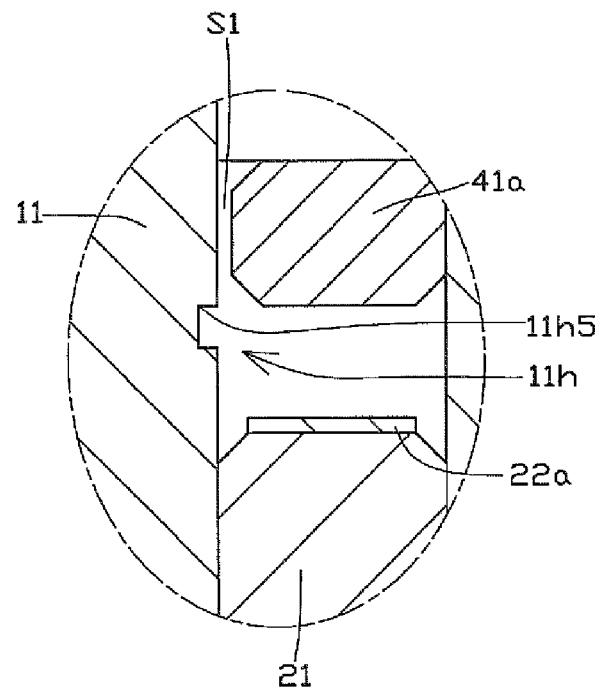
FIG. 9 is a variant of FIG. 4.

Furthermore, for example, as shown in FIG. 9, the upper corner part 11h5 may be disposed at the same height as the lowermost surface of the seal member 41a in the axial direction.

Supposing that, the upper corner part 11h5 were above the lowermost surface of the seal member 41a and disposed facing the inner circumferential face of the seal member 41a in the radial direction, oil that had been sprayed from the annular groove 11h in the radially outward direction and rebounded would readily be redeposited on the rotary shaft 11, such that the oil from the oil-impregnated bearing 21 would not readily be recirculated.

Here, as shown in FIG. 9, if the upper corner part 11h5 is disposed at the same height as the lowermost surface of the seal member 41a in the axial direction, the oil from the oil-impregnated bearing 21 will be slightly less readily sprayed in the radially outward direction than in the third exemplary mode of embodiment but this will have similar actions and effects to those in the third exemplary mode of embodiment.

Figure 10:
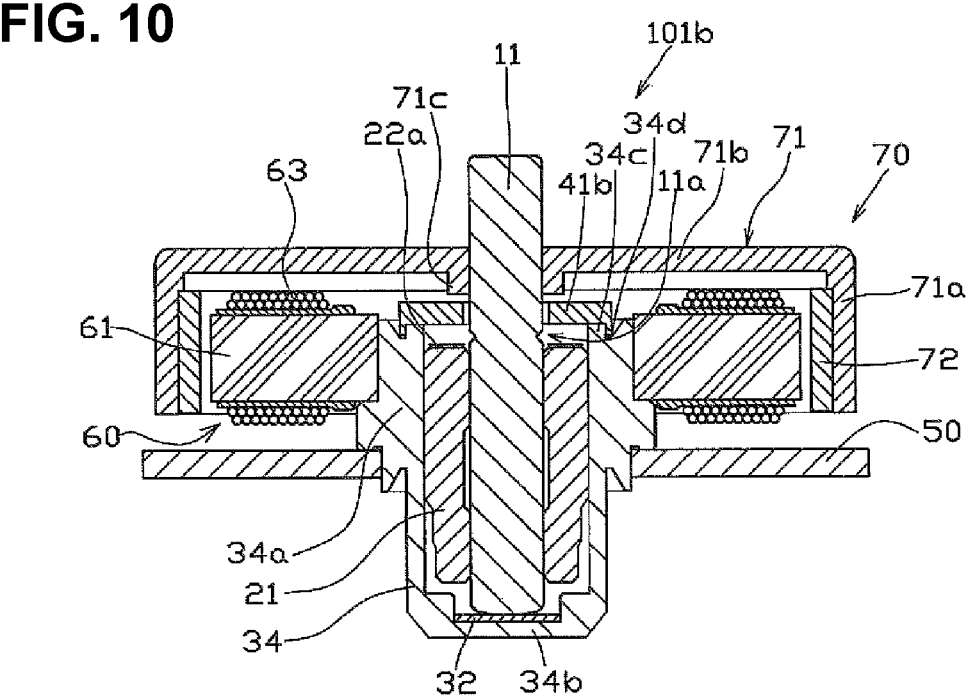
FIG. 10 is a variant of FIG. 5.

Furthermore, in the exemplary modes of embodiment described above, the seal member 41a is a cylindrical body and is fixed to the inner circumferential face of the opening in the bearing holder 31 by press-fitting, but so long as the seal member has a shape that can be fixed in the opening of the bearing holder 31 so as to close the opening, the invention is not limited to this. For example, this may be a seal member 41b having a cap-shaped body fixed to the opening of a cylindrical part 34a of a bearing holder 34, as in the brushless motor 101b shown in FIG. 10.

This seal member 41b has a through-hole in the center, and the inner diameter of this through-hole is formed slightly larger than the outer diameter of the rotary shaft 11. The entire surface of the seal member 41b is subjected to oil-repellent treatment. The seal member 41b and the rotary shaft 11 have a radial closing gap such as described above. An upwardly protruding annular protrusion 34c and a fitting groove 34d located at the outer circumferential portion of the annular protrusion 34c are formed at the upper end of the cylindrical part 34a. Furthermore, the seal member 41b is fixed in the fitting groove 34d by press-fitting or the like. This mode will also have similar actions and effects to those of the exemplary modes of embodiment described above.

The outer diameter of the washer member 22a in the exemplary modes of embodiment described above is formed slightly smaller than the inner diameter of the bearing holder 31, 34 and thus a gap is formed between the inner circumferential face of the bearing holder 31, 34 and the outer circumferential face of the washer member 22a but the invention is not limited to this. If the inner diameter of the washer member is formed slightly larger than the outer diameter of the rotary shaft 11, a mode such as follows is conceivable.

Figure 11:
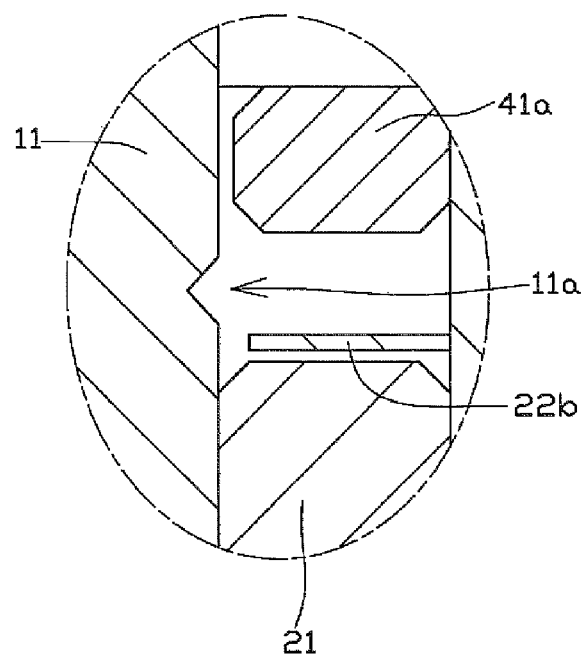
FIG. 11 is a variant of FIG. 2.

For example, as shown in FIG. 11, the outer diameter of a washer member 22b may be formed to be the same as the inner diameter of the bearing holder 31, 34, and the washer member 22b may be fixed by press-fitting on the inner circumferential face of the bearing holder 31, 34. The washer member 22b is disposed in mutual non-contact proximity to the oil-impregnated bearing 21 in the axial direction, such that the washer member 22b and the oil-impregnated bearing 21 have a gap in the axial direction. In this case, while the recirculation of the oil from the oil-impregnated bearing 21 will occur slightly less readily, this will have similar actions and effects to those of the exemplary modes of embodiment described above. The reason for this gap is to prevent the pores on the top face of the oil-impregnated bearing 21 from being crushed.

Furthermore, in the first exemplary mode of embodiment, the first inclined straight part 11a1 and the second inclined straight part 11a2 of the annular groove 11a are formed at angles of inclination of 45 degrees with respect to the axial direction, but these angles of inclination can be freely established. However, the angles of inclination of the first inclined straight part 11a1 and the second inclined straight part 11a2 are each preferably in the range of 30 degrees to 60 degrees. If the angle of inclination is less than 30 degrees, it is possible that the oil from the oil-impregnated bearing 21 will less readily accumulate in the minimum diameter part, and thus the oil will less readily be sprayed radially outward from the minimum diameter part 11a3 by the centrifugal force of the rotary shaft 11. If the angle of inclination exceeds 60 degrees, it is possible that the oil from the oil-impregnated bearing 21 will readily jump over the annular groove when the oil from the oil-impregnated bearing 21 is transmitted upward on the rotary shaft 11.

Furthermore, in the first exemplary mode of embodiment, the angles of inclination of the first inclined straight part 11a1 and the second inclined straight part 11a2 are 45 degrees, and the minimum diameter part 11a3 is disposed between the uppermost surface of the washer member 22a and lowermost surface of the seal member 41a in the axial direction, and formed such that the length from the lower end to the upper end of the annular groove 11a is approximately half of the axial length from the uppermost surface of the washer member 22a to the lowermost surface of the seal member 41a, but the invention is not limited to this.

However, if the angles of inclination of the first inclined straight part 11a1 and the second inclined straight part 11a2 are 45 degrees, and the minimum diameter part 11a3 is disposed between the uppermost surface of the washer member 22a and the lowermost surface of the seal member 41a, it is preferable that the length from the lower end to the upper end of the annular groove 11a is ¼ to ¾ of the length in the axial direction from the uppermost surface of the washer member 22a to the lowermost surface of the seal member 41a.

If the length from the lower end to the upper end in the annular groove 11a is less than ¼ of the length in the axial direction from the uppermost surface of the washer member 22a to the lowermost surface of the seal member 41a, it is possible that the oil from the oil-impregnated bearing 21 will readily jump over the annular groove when the oil from the oil-impregnated bearing 21 is transmitted upward on the rotary shaft 11.

If the length from the lower end to the upper end in the annular groove 11 a exceeds ¾ of the length in the axial direction from the uppermost surface of the washer member 22a to the lowermost surface of the seal member 41a, the annular groove 11a will be large, such that the upper circumferential face will be small, and thus the distance over which the oil moves upward on the upper circumferential face will be reduced, and it is possible that the oil will more readily enter the first gap S1.

What is claimed is:

1. A bearing device comprising:
   a vertically elongated rotary shaft;
   an annular oil-impregnated bearing that rotatably supports the rotary shaft;
   a bearing holder having an opening at an upper end that holds the oil-impregnated bearing inside the opening;
   a washer member disposed on a top face of the oil-impregnated bearing; and
   an annular seal member through which the rotary shaft is inserted, which is fixed at the upper end of the bearing holder so as to close the opening,
   wherein
   an outer surface of the seal member and an outer circumferential face of the rotary shaft that faces the seal member in a radial direction are subjected to oil-repellent treatment;
   the washer member and the seal member are disposed in a mutually non-contacting state in an axial direction;
   the rotary shaft has an annular groove in the outer circumferential face, and an upper portion of the rotary shaft protrudes upward beyond the seal member;
   a minimum diameter part of the annular groove is disposed between an uppermost surface of the washer member and a lowermost surface of the seal member;
   an upper end of the annular groove is disposed axially below an uppermost surface of the seal member; and
   there is a gap between an inner circumferential face of the bearing holder and an outer circumferential face of the washer member extending around the entire circumference of the washer member.

2. The bearing device according to claim 1 wherein the upper end of the annular groove is disposed axially below the lowermost surface of the seal member.

3. The bearing device according to claim 2 wherein
an upper circumferential face is formed on the outer circumferential face of the rotary shaft between the upper end of the annular groove and the lowermost surface of the seal member; and
the upper circumferential face is subjected to oil-repellent treatment.

4. The bearing device according to claim 1 wherein
a lower end of the annular groove is disposed axially above the uppermost surface of the washer member.

5. The bearing device according to claim 1 wherein
the upper end of the annular groove is disposed axially below the lowermost surface of the seal member; and
a lower end of the annular groove is disposed axially above the uppermost surface of the washer member.

6. The bearing device according to claim 5 wherein
an upper circumferential face is formed on the outer circumferential face of the rotary shaft between the upper end of the annular groove and the lowermost surface of the seal member; and
the upper circumferential face is subjected to oil-repellent treatment.

7. A brushless motor having a bearing device in which a vertically elongated rotary shaft is rotatably supported by an annular oil-impregnated bearing, wherein the bearing device comprises
a bearing holder having an opening at an upper end that holds the oil- impregnated bearing inside the opening;
a washer member disposed on a top face of the oil-impregnated bearing; and
an annular seal member through which the rotary shaft is inserted, which is fixed at the upper end of the bearing holder so as to close the opening,
wherein
an outer surface of the seal member and an outer circumferential face of the rotary shaft that faces the seal member in a radial direction are subjected to oil-repellent treatment;
the washer member and the seal member are disposed in a mutually non-contacting state in an axial direction;
the rotary shaft has an annular groove in the outer circumferential face, and an upper portion of the rotary shaft protrudes upward beyond the seal member;
a minimum diameter part of the annular groove is disposed between an uppermost surface of the washer member and a lowermost surface of the seal member;
upper end of the annular groove is disposed axially below an uppermost surface of the seal member; and
there is a gap between an inner circumferential face of the bearing holder and an outer circumferential face of the washer member extending around the entire circumference of the washer member.

8. The brushless motor according to claim 7 wherein
the upper end of the annular groove is disposed axially below the lowermost surface of the seal member.

9. The brushless motor according to claim 8 wherein
an upper circumferential face is formed on the outer circumferential face of the rotary shaft between the upper end of the annular groove and the lowermost surface of the seal member; and
the upper circumferential face is subjected to oil-repellent treatment.

10. The brushless motor according to claim 7 wherein
a lower end of the annular groove is disposed axially above the uppermost surface of the washer member.

11. The brushless motor according to claim 7 wherein
the upper end of the annular groove is disposed axially below the lowermost surface of the seal member; and
a lower end of the annular groove is disposed axially above the uppermost surface of the washer member.

12. The brushless motor according to claim 11 wherein
an upper circumferential face is formed on the outer circumferential face of the rotary shaft between the upper end of the annular groove and the lowermost surface of the seal member; and
the upper circumferential face is subjected to oil-repellent treatment.

* * * * *